United States Patent
Zambelli et al.

(10) Patent No.: US 6,271,313 B1
(45) Date of Patent: Aug. 7, 2001

(54) STYRENE-BUTADIENE BLOCK COPOLYMER

(75) Inventors: Adolfo Zambelli, Baronissi; Alfonso Grassi, Salerno; Michela Caprio, Avellino, all of (IT); Daniel Edward Bowen, III, Munroe Falls, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 09/366,864

(22) Filed: Aug. 4, 1999

Related U.S. Application Data

(60) Provisional application No. 60/113,100, filed on Dec. 21, 1998.

(51) Int. Cl.$^7$ .................................................. C08F 25/02
(52) U.S. Cl. .................................................. 525/242
(58) Field of Search .............................................. 525/242

(56) References Cited

U.S. PATENT DOCUMENTS

| | | | |
|---|---|---|---|
| 5,134,199 | 7/1992 | Hattori et al. | ........................ 525/314 |
| 5,202,387 | 4/1993 | Halasa et al. | ........................ 525/316 |

FOREIGN PATENT DOCUMENTS 1379750    1/1975   (GB) .

*Primary Examiner*—Terressa M. Boykin
(74) *Attorney, Agent, or Firm*—Alvin T Rockhill

(57) ABSTRACT

This invention is based upon the unexpected discovery that styrene-butadiene block copolymers having syndiotactic polystyrene (sPS) blocks and cis-1,4-polybutadiene (PBd) blocks can be synthesized by polymerizing styrene and 1,3-butadiene utilizing certain catalyst systems when the polymerization is conducted at a pressure which is within the range of about 10 mm of mercury to about 50 mm of mercury at a temperature which is within the range of about 0° C. to about 100° C. This invention more specifically discloses a styrene-butadiene block copolymer which is comprised of (a) syndiotactic polystyrene blocks and (b) cis-1,4-polybutadiene blocks, wherein said cis-1,4-polybutadiene blocks have a vinyl content of up to about 20 percent, wherein the syndiotactic polystyrene blocks have a syndiotactic microstructure content of at least 50 percent, wherein the block copolymer contains at least five syndiotactic polystyrene blocks and wherein said block copolymer has a number average molecular weight which is within the range of about 10,000 to about 700,000.

22 Claims, No Drawings

STYRENE-BUTADIENE BLOCK COPOLYMER

This application claims the benefit of U.S. Provisional Application No. 60/113,100 filed Dec. 21, 1998.

BACKGROUND OF THE INVENTION

The term "metallocene" was first used in the mid-1950s as a replacement for the colloquialism "iron sandwich," a name given to $Cp_2Fe$, where Cp is cyclopentadienyl, after the $\eta^5$-bonding mode of the Cps was first described independently by Wilkinson and Fischer in 1954. Now the term is used to describe any transition metal complex which has one or more Cp or substituted Cp ligands bound to it (see K B Sinclair and R B Wilson, Chem Ind 1994, 7, 857). Much of the initial interest and research in the area of early metal bent metallocenes (a metallocene with two Cps where the Cp(centroid)-metal-Cp(centroid) angle is less than 180° C., example $Cp_2TiCl_2$) was due to an effort to model the highly active and stereoselective heterogeneous Ziegler-Natta polymerization catalysts (see H H Brintzinger et al, Angew Chem Int Ed Engl 1995, 34, 1143), which are based on early metals such as $TiCl_n/AlR_{m-p}Cl_p$, where R is an alkyl group, for example methyl (Me) or ethyl (Et), n is 3 or 4, m is 3, and p is 1, 2 (see P Locatelli et al, Trends Poly Science 1994, 2, 87).

Bent metallocene models, based particularly on Group IV metals, offered promise of elucidating key features of the homogeneous polymerizations which they catalyzed. It was believed this information could then be related to the field of conventional Ziegler-Natta catalysis. As models, Group IV metal bent metallocenes offered several advantages. These advantages included simple coordination geometries, only two reactive ligand sites with cis orientation, and from a practical standpoint, compatibility with spectroscopic techniques, such as NMR, allowing more direct observation of the active catalyst species. It would now appear that these "models" are replacing the existing Ziegler-Natta polymerization catalyst systems in many applications (see H H Brintzinger et al, Angew Chem Int Ed Engl 1995, 34, 1143).

It has been known since the mid-1950s that $Cp_2TiCl_2$ and $Et_2AlCl$ catalyze the formation of polyethylene under conditions similar to those used in conventional heterogeneous Ziegler-Natta catalysis (see D S Breslow and N R Newburg, J Am Chem Soc 1957, 79, 5072). By 1960, several of the key features in systems like this had been deduced by various spectroscopic techniques. The key features included the formation of $Cp_2TiRCl$, where R is Me, Et or a related species, by exchange with the alkylaluminum co-catalyst, polarization of the Ti—Cl bond in this species by Lewis acidic centers forming an adduct of the type $Cp_2TiRCl.AlRCl_2$, and insertion of the olefin into the Ti—R bond of this electron deficient species. However, these types of model systems are only capable of polymerizing ethylene, which is in contrast to the heterogeneous Ziegler-Natta catalysts which can also polymerize propylene. This limitation proved to be a serious obstacle to progress in this field.

A breakthrough occurred in the late 1970s when Sinn and Kaminsky serendipitously observed that the addition of small amounts of $H_2O$ to the otherwise inactive catalyst system of $Cp_2MMe_2/AlMe_3$, where M is Ti or Zr, imparted a surprisingly high activity for ethylene polymerization (see H Sinn and W Kaminsky, Adv Organomet Chem 1980, 18, 99). It was suspected that partial hydrolysis of $AlMe_3$ formed methylaluminoxane (MAO) which is of the general formula $Me_2AlO$—$[Al(Me)O]_n$—$AlMe_2$ where n is generally thought to represent an integer from 5 to 20, which then acted as an efficient co-catalyst. This idea was supported by directly synthesizing MAO and successfully utilizing it as a co-catalyst with not only $Cp_2ZrMe_2$, but also $Cp_2ZrCl_2$ (see H Sinn et al, Angew Chem Int Ed Engl 1980, 19, 396). Activity in certain examples are even higher than in conventional Ziegler-Natta catalyst systems. Activity as high as 40,000 Kg PE/g metal/h have been reported employing zirconocene catalysts activated with MAO with an Al:Zr ratio of 12,000 (Mw=78,000) (see W Kaminsky et al, Makromol Chem Rapid Commun 1983, 4, 417). Furthermore, Sinn and Kaminsky demonstrated that these types of MAO-activated homogeneous metallocene catalysts are capable of polymerizing propylene and other $\alpha$-olefins, however, without any stereoregularity (see H Sinn and W Kaminsky, Adv Organomet Chem 1980, 18, 99).

The role of the MAO in early metal metallocene catalysis is now believed to be threefold. First, MAO acts as an alkylating agent for the generation of metal-alkyl adducts. Second, MAO acts as a strong Lewis acid, abstracting an anionic ligand thereby forming the crucial alkyl cationic species. Finally, MAO and especially $AlMe_3$ impurities in the MAO act as a scavenger for removing catalyst poisons (for example, $H_2O$ which would react with $AlMe_3$, forming more MAO) in the olefin and solvent (see A D Horton, Trends Polym Sci 1994, 2, 158).

The role of MAO as a co-catalyst is now fairly well understood; however, at the time of Kaminsky and Sinn's discovery, this was not the case. The nature of the active catalyst species derived from these MAO-activated early metal metallocene model complexes remained unclear. Compounding this problem is the remarkably complex nature of MAO, as well as the large excess required for high activity. In fact, the exact structure(s) of MAO remains unknown to this day (see J C W Chien et al, J Poly Sci, Part A, Poly Chem 1991, 29(4), 459). Much of the debate at the time revolved around whether or not the active species was bimetallic or cationic. Natta, Sinn, and others supported a theory which suggested the active catalyst was a bimetallic species in which an alkyl group or halide bridged the Group IV metal and the aluminum center promoting olefin insertion (see G Natta and G Mazzanti, Tetrahedron 1960, 8, 86). Shilov and others supported a theory which suggested insertion of the olefin actually occurs at a truly cationic species, such as $[Cp_2TiR]^+$ (see A K Zefirova and A E Shilov, Dokl Akad Nauk SSSR 1961, 136, 599).

In 1986, Jordan helped resolve this issue by isolating tetraphenylborate salts of base stabilized zirconocene alkyl cations such as $[Cp_2ZrR(THF)]^+$, where R represents an Me or benzyl (Bz) group, and THF is tetrahydrofuran (see R F Jordan et al, J Am Chem Soc 1986, 108, 1718). Jordan, also demonstrated their ability to polymerize olefins without the presence of any co-catalyst (see R F Jordan, Adv Organomet Chem 1991, 32, 325). Subsequent research by Jordan and other groups gave credence to the idea that an alkyl cation is a crucial intermediate in Group IV metal bent metallocene based olefin polymerizations.

Several requirements are now widely considered critical in the formation of Group IV metal bent metallocene catalysts active for olefin polymerization. An active catalyst must have a $d^o$, $14e^-$, Lewis acidic metal center, a coordinately unsaturated metal center, and a vacant coordination site cis to a reactive M—R bond.

Group IV metal bent metallocenes activated with large excesses of MAO can polymerize $\alpha$-olefins, but the large excess of MAO required is often impractical from an industrial standpoint due to the high cost of MAO, as well as the requisite high catalyst residue left in the resulting polymer. One solution to this problem evolved from the observation that insertion of an olefin into an M—R bond can only occur if the counterion is bound very weakly, noting that even large, bulky counterions, for example, $BPh_4^-$ and $C_2B_9H_{12}^-$, coordinate to the cationic metal centers quite strongly, producing catalysts with only moderate activity (see G G Hanky et al, J Am Chem Soc 1989, 111, 2728). In order to produce weakly or non-coordinating counterions, the general idea of placing electron withdrawing substituents at the periphery of the boron counterion center has worked well. The most successful electron withdrawing substituents have been fluorinated phenyls which produce stable, yet weakly coordinating counterions (for example, $B(C_6F_5)_3$, [$HNMe_2Ph$] [$B(C_6F_5)_4$], and [$C(Ph)_3$] [$B(C_6F_5)_4$]). The resulting catalytic species are not only highly active polymerization catalysts, capable of polymerizing propylene and higher α-olefins, but they also demonstrated that active catalysts can be produced without base stabilization and without using MAO.

We have seen early metal bent metallocene catalysts based on the Cp ligand have been developed which are active for propylene polymerization, but none thus far have been stereoselective. Chiral Group IV ansa-metallocenes were developed by Brintziner using ethylene-bridged indenyl and tetrahydroindenyl ligands on Group IV metal halides. These types of compounds were shown independently by Ewen, Kaminsky, and Brintzinger to maintain their chiral geometries in solution under catalytic conditions enabling the formation of highly isotactic poly-α-olefins, including isotactic polypropylene (see J A Ewen, J Am Chem Soc 1984, 106, 6355). These findings lead to extensive exploration of the mechanisms by which these catalysts control the stereochemistry of polymer growth. A large number of chiral metallocenes were synthesized in an attempt to understand how ligand geometry affects a catalysts activity, as well as polymer microstructure, molecular weight, and what olefins can be polymerized.

It was soon discovered that higher catalytic activity could be achieved if the ethylene bridge was replaced with a silylene bridging unit. This produced a more rigid ligand framework, as well as favorable electronic characteristics (a dimethylsilane bridge is generally considered to donate electron density to the metal center) (see European Patent Application No. 302,424). It was also found that placing methyl groups at the 2 and 2' positions of the bridged indenyl ligands increased polymer molecular weight and increased catalyst activity, again by making a more rigid ligand system (as shown below). Other advancements in this area dealt with co-catalyst development and the idea of "preactivating" a catalyst by exposing it to MAO before the monomer was introduced. Overall, these improvements, while impressive, still fell short in providing a commercially viable catalyst.

The area of ethylene, propylene, and higher α-olefin polymerization to form various thermoplastics has been the area of most intense research and industrial application with respect to metallocene catalysts. Catalysts with potential commercial viability for the formation of polypropylene (isotactic, syndiotactic, and hemi-isotactic) are described in the literature. These catalysts represent the state of the art in the area of α-olefin polymerization, demonstrate what is possible, and illustrate some of the nuances associated with successful catalyst design (see W Spaleck et al, Organometallics 1994, 13, 954).

Spaleck extended the usefulness of catalysts based on dimethylsilylene bridged indenyl ligands by systematically substituting different aromatic groups at the 4, 4' and 5, 5' positions of the indenyl benzo ring. This "rational catalyst design" approach allowed Spaleck to determine the best catalyst contained a ligand bearing a naphthyl moiety at the 4, 4' positions (as shown below). The zirconium catalysts employing this ligand system showed remarkable polymerization characteristics, including high activity, high polymer molecular weight, and excellent stereoregularity.

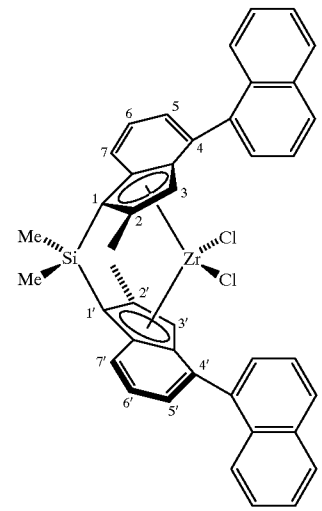

The extremely high activity of the Spaleck catalyst is impressive. However, solution polymerizations, in general, have certain intrinsic disadvantages, including high Al:Zr co-catalyst loadings (for instance, 15,000:1), lack of morphology control, and reactor fouling.

The practical implementation of metallocene catalysts, despite their high cost, stems from a number of important factors. The most important factor has been the ability to support metallocenes on an inert substrate, such as silica, and still maintain high polymerization activity. The benefit is largely due to the fact that, when compared to unsupported metallocenes, supported metallocene catalysts require a much smaller amount of MAO co-catalyst to achieve high activity. This reduces the overall cost and lowers the amount of residual co-catalyst in the polymer produced. In general, MAO is superior to the discrete cation forming co-catalyst developed by Turner and Marks, if it can be used in small amounts, because it is usually less expensive and scavenges common catalyst poisons. In addition, supported heterogeneous catalysts offer improved control over polymer morphology and can be used in economically advantageous bulk and gas phase polymerization processes.

The ability of these catalysts to produce highly stereoregular polymers is critical to their value as catalysts. The origin of this stereoregularity is becoming more clear. It is generally accepted that, in isotactic polypropylene, chain growth results from a regeoselective 1,2 insertion of the propylene monomer into the metal atom and the first carbon of the polymer chain. Differentiation between one of the two prochiral faces of the propylene monomer in coordination and insertion was believed to be influenced by two separate control mechanisms.

The first mechanism was "enantiomorphic site control" where the sterics of the ligand influenced the orientation of the incoming monomers. The second mechanism was "chain end control" where the stereochemistry of the last inserted monomer dictates the orientation of the subsequently inserted monomer. In accord with current thought, Spaleck suggests the two control mechanisms are less separable and invokes "indirect steric control" (see L A Catonguay and A R Rappe, J Am Chem Soc 1992, 114, 5832). In this mechanism, the 1,2 insertion of the prochiral monomer is mainly influenced by the orientation of, at least, the 4 or 5 carbon atoms closest to the metal center in the growing polymer chain. The orientation of these carbon atoms in the polymer chain are, in turn, influenced by the catalyst ligand geometry. The pendent naphthyl group in the Spaleck catalyst is believed to optimize the influence of the ligand on the polymer chain, thus increasing the steric control over the next inserted monomer.

Spaleck discusses a 100 percent synergistic effect between the 2,2'-methyl substituents on the indenyl cyclopentadienyl ring and the 4,4'-naphthyl substituents on the indenyl benzo ring. This effect, along with the known importance of the interaction between the 2-methyl substituents and the methyls of the silicone bridge, combine to produce the delicate balance required to obtain highly active and selective catalysts. Spaleck also notes that electronic effects in these catalyst systems play an important role.

An industrially significant class of catalysts based on a mono-Cp platform is disclosed by U.S. Pat. No. 5,254,405 and European Patent Application 416,815. These "constrained geometry" catalysts demonstrate a high degree of variability, producing polypropylene which can range from 23 percent mmmm pentads in a polymer with a 1:1 ratio of m and r stereo placements, to 93.4 percent mmmm pentads in a polymer with over 98 percent m stereo placements. Catalysts in this class incorporating a fluorenyl group instead of a Cp can produce predominately syndiotactic polypropylene if the substituent on the nitrogen heteroatom is a cyclohexyl group and isotactic polypropylene if the substituent on the heteroatom is a t-butyl group. Catalysts in this class are also very good at copolymerizing higher α-olefins with ethylene. It should be noted that Ti is the group 4 metal of choice for this class of catalysts.

Other catalysts on the cutting edge of α-olefin polymerization technology include catalysts based on methylene bridged Cp and fluorenyl ligand systems, which can also produce isotactic, syndiotactic, and hemi-isotactic polypropylene, as well as certain copolymers depending on the presence of various substituents (see J A Ewan et al, J Am Chem Soc 1988, 110, 6255).

The impact of metallocene and, in particular, early metal bent metallocene catalysts on the polyolefin industry has been dramatic and unparalleled in any other chemical industry in recent times. The tremendous effort put forth by the scientific community in this area has allowed rapid progression from metallocenes as Ziegler-Natta model systems, to metallocenes as viable industrial catalyst in their own right. A number of factors have contributed to this success, including their ability to maintain high activity while supported, as well as high stereoselectivity. Another attractive feature of metallocenes is the potential to use them as "drop-in" substitutes for existing Ziegler-Natta catalysts. The conditions required for polymerization with metallocenes are similar enough to those used with present catalysts.

Some of the advantages of metallocene catalysts are likely to be specific to α-olefins, but some general advantages can be identified. Metallocene catalysts exhibit four main advantages, which distinguish them from other polyolefin catalyst systems with a few exceptions (see L K Johnson et al, J Am Chem Soc 1995, 117, 6414). First, metallocenes can polymerize a wider variety of vinyl monomers than heterogeneous Ziegler-Natta catalysts, irrespective of molecular weight or steric hindrance. This provides opportunities for the polymerization and copolymerization of olefins, α-olefins, and potentially functionalized monomers in combinations heretofore inaccessible with conventional catalyst systems. Second, metallocenes are single site catalysts, where all of the active sites in a polymerization are identical. This allows the production of uniform polymers and copolymers with narrow molecular weight distributions and narrow compositional distributions. Third, because the main chain termination step in metallocene catalysis is β-hydrogen elimination, the resulting polymer contains chains with unsaturated end groups. An unsaturated end group provides a reactive moiety which can be used for functionalizing the polymer or for further graft polymerization. Finally, metallocenes can polymerize olefins with not only high regioselectivity, but also very high stereoselectivity. This allows an ever increasing degree of control over polymer microstructure as knowledge of the catalyst structure/ polymer tacticity relationship increases (see J A Ewen, J Makromol Chem, Macromol Symp 1993, 66, 179).

Early metal metallocene catalysts have dominated the transition away from the more traditional Ziegler-Natta catalyst systems in the α-olefin polymerization industry, with one notable exception. Mono-cyclopentadienyl, 12 e$^-$, Group IV metal complexes are excellent catalysts for the syndiospecific polymerization of the aromatic α-olefin styrene (and various substituted styrenes) when activated with a co-catalyst such as MAO (see N Ishihara et al, Macromolecules 1986, 19, 2464). Early metal mono-cyclopentadienyl catalysts are often referred to as "half-sandwich" or "piano-stool" complexes. Styrene is an α-olefin but, because of its unique properties, it is often treated separately from other α-olefins.

Catalysts which polymerize styrene in a syndiotactic fashion have only been known since the mid-1980s. Catalysts other than piano-stool complexes which, when properly activated, promote the syndiotactic polymerization of styrene include TiX$_4$ species, where X is a halide, alkoxide, or alkyl group. The former catalytic species are also known to promote the highly stereoregular polymerization of certain conjugated dienes when activated with the proper co-catalysts (see U.S. Pat. No. 5,023,304).

Unlike many bent metallocene catalyzed α-olefin polymerizations, where much is known about the active catalytic species, not as much is known about the exact nature of the catalytic species derived from piano-stool complexes. However, most of the research which has been conducted on piano-stool catalysts has been concerned with the syndiotactic polymerization of styrene. As a consequence, most of the information concerning the mechanisms and catalyst structures involved in these polymerizations has come from this literature. As mentioned, catalysts derived from piano-stool compounds are also capable of polymerizing certain types of conjugated dienes. A number of similarities appear to exist between the polymerization of styrene and conjugated dienes with piano-stool catalysts (see A Zambelli et al, Makromol Chem, Macromol Symp 1991, 48/49, 297). As the use of piano-stool catalysts for the purpose of polymerizing conjugated dienes is a relatively new field of organometallic chemistry, not as much research has been conducted on this subject as has been on the syndiotactic polymerization of styrene. Therefore, a closer inspection of what is known about the active species involved in syndiotactic styrene polymerization may shed some light on the mechanisms and catalyst structures involved in piano-stool catalyzed conjugated diene polymerization.

In the syndiotactic polymerization of styrene, at least with respect to titanium-based piano-stool catalysts, it has been suggested the active species is a mono-Cp, Ti(III), alkyl cation.

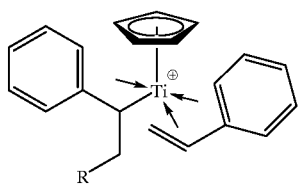

As shown above, a single styrene monomer has inserted in a 2,1 fashion into a Ti(III)-R$^+$ bond and has adopted an $\eta^2$-benzyl structure. The formation of a Ti(III) metal center from a Ti(IV) metal center in this type of catalyst has recently been shown by Grassi to take place when Cp*TiR$_3$, where Cp* is pentamethylcyclopentadienyl and R is Me or Bz, is reacted with B(C$_6$F$_5$)$_3$ at room temperature (25° C.) in chlorobenzene and toluene by ESR (see A Grassi et al, Organometallics 1996, 15, 480 and A Grassi et al, Macromol Chem Phys 1995, 196, 1093). In fact, the reduction of Ti(IV) to Ti(III) was shown to be accelerated in the presence of styrene and certain substituted styrenes, but it is important to note that this reduction is not quantitative. The choice of counterion or co-catalyst in the formation of the Ti(IV) catalyst precursor appears to make little difference. Chien showed by ESR that Ti(III) species formed from trishalide-, trisalkoxide-, etc, piano-stool complexes when they were reacted with MAO in a manner analogous to the system developed by Kaminsky and Sinn (see U Bueschges and J C W Chien, J Polym Sci, Part A 1989, 27, 1525 and J C W Chien et al, Macromolecules 1992, 25, 3199). It should be noted that, if MAO is the co-catalyst, then R is Me in the above structure. In general, R is whatever alkyl substituent is transferred to the metal center from the alkyl aluminum co-catalyst. R could also represent the growing polymer chain after a number of insertions have taken place. If the starting material is an alkylated piano-stool complex, the addition of B(C$_6$F$_5$)$_3$ is believed to initially form a discrete Ti(IV)R$_2^+$ complex which, depending on the conditions, may eventually decompose into Ti(III) species. With respect to syndiotactic polystyrene (sPS) formation, it is generally accepted that the active species in these systems contain paramagnetic Ti(III) metal centers which have been reduced from Ti(IV). However, the mechanism of this decomposition is not known and at least in the case where B(C$_6$F$_5$)$_3$ is used as a co-catalyst, seems to be solvent, temperature and monomer sensitive. Other evidence that Ti(III) species are operative in this class of catalyst comes from the observation that CpTi(III)Cl$_2$ species perform equally as well as CpTi(IV)Cl$_3$ complexes as catalyst precursors for the syndiotactic polymerization of styrene.

The active species in the structure shown above is a 14 e$^-$ complex, if by analogy to Ziegler-Natta 1,4 diene polymerization catalysts, the phenyl ring of the last inserted styrene monomer in the growing polymer coordinates to the metal center and an $\eta^4$-coordination mode is assumed for the coordinated styrene monomer (see L Porri et al, Prog Polym Sci 1991, 16, 405). The phenyl ring of the last inserted styrene monomer when coordinated to the metal center strongly resembles an $\eta^2$-benzyl moiety. It should be noted that only a 2,1 insertion of styrene will allow this type of interaction (see A Zambelli et al, Makrol Chem, Macromol Symp 1995, 89, 373). It is known from molecular orbital calculations that all six carbons in the phenyl ring of a benzyl substituent participate in bonding with the metal center even though they are commonly referred to as $\eta^2$-benzyls rather than $\eta^6$- or $\eta''$-benzyls. Furthermore, the formation and spectroscopic identification of $\eta^6$-arene adducts similar to those depicted in the structure shown above has been demonstrated (see C Pellecchia et al, Organometallics 1993, 12, 4473). For example, a [Cp*MMe$_2$($\eta^6$-C$_6$H$_5$Me)] [MeB(C$_6$F$_5$)$_3$] arene adduct is formed when Cp*MMe$_3$ is reacted with B(C$_6$F$_5$)$_3$ in toluene at low temperatures, where M represents Zr or Hf (see D Gillis et al, J Am Chem Soc 1993, 115, 2543).

It has been shown that the Cp moiety remains bound to the metal center and is part of the active species in these polymerizations. Various substituted Cps have also been used successfully in piano-stool type catalysts for the syndiotactic polymerization of styrene. For example, if an indenyl is used in place of Cp in a Ti-based trichloride piano-stool complex, the following catalyst can be synthesized, IndTiCl$_3$, where Ind is indenyl (see T E Ready et al, Macromolecules 1993, 26, 5822). Ready showed that the indenyl-substituted catalyst is actually superior to the Cp analog for syndiotactic polystyrene formation. In a head-to-head comparison, IndTiCl$_3$, when activated with varying amounts of MAO, showed higher activity, yield, and percent syndiotacticity than MAO-activated CpTiCl$_3$. The improved catalyst performance was attributed to the greater electron donating ability of the indenyl ring relative to the Cp moiety (see P G Gassman and C H Winter, J Am Chem Soc 1988, 110, 6130). However, Cp* is known to donate more electron density to metal centers it is coordinated to than Cp, but CpTiCl$_3$ and Cp*TiCl$_3$ perform equally well as styrene polymerization catalyst when activated with MAO. With respect to sPS activity, the order of catalyst performance appears to be IndTiCl$_3$>Cp*TiCl$_3$=CpTiCl$_3$=CpTiCl$_2$>CpTiCl$_2$.2THF> Cp$_2$TiCl$_2$>Cp$_2$TiCl. Even Ti(II) species like Ti(ph)$_2$ produce sPS, albeit with low activity (see A Zambelli et al, Macromolecules 1989, 22, 2129).

Metallocene catalysts which are capable of polymerizing conjugated dienes are rare. In fact, the only thoroughly studied metallocenes which can polymerizing conjugated dienes are the piano-stool complexes. As has been explained, these types of catalysts are also capable of polymerizing styrene.

In diene polymerization, with respect to Ti-based piano-stool catalysts, the active species has been proposed to be the following mono-Cp, Ti(III), 14 e$^-$, allyl cationic species (see G Ricci et al, J Organomet Chem 1993, 451, 67):

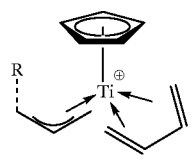

This is based on some of the ideas discussed above, as well as the mechanism involved in Ziegler-Natta catalyzed 1,4 diene polymerizations and other evidence. In the structure shown above, 1,3 butadiene is used as the conjugated diene.

Zambelli discloses MAO-activated CpTiCl$_3$ as being used to copolymerize butadiene and isoprene, among other things (see A Zambelli et al, Macromol Chem Phys 1994, 195, 2623). The polymerizations were catalyzed with 2 mg of CpTiCl$_3$ with a Al:Ti ratio of 1100:1 at 18° C. in 3 ml of toluene. The concentrations of butadiene and isoprene were varied, producing copolymer with different molar ratios of each monomer as shown below.

| Butadiene (g) | Isoprene (g) | Time (min) | Yield (g) | Conv (%) | Molar Ratio Butadiene/ Isoprene in Polymer |
|---|---|---|---|---|---|
| 0.752 | 1.84 | 35 | 0.143 | 5.5 | 2.12 |
| 0.795 | 2.79 | 35 | 0.12 | 3.3 | 1.50 |
| 0.779 | 3.88 | 35 | 0.082 | 1.8 | 1.03 |
| 0.784 | 4.36 | 35 | 0.04 | 0.8 | 1.10 |
| 0.784 | 7.08 | 60 | 0.085 | 1.1 | 0.45 |
| 0.790 | 9.26 | 60 | 0.031 | 0.3 | 0.312 |
| 0.216 | 4.77 | 120 | 0.09 | 1.8 | 0.20 |

In general, butadiene was determined to be more reactive than isoprene in this copolymerization. However, nearly equal amounts of both monomers can be incorporated into the copolymer product if the concentrations of the monomers are adjusted appropriately. As can be seen, the copolymerization rate strongly decreases with increasing isoprene concentration and decreasing butadiene concentration.

For comparison purposes, Zambelli also homopolymerized several dienes and styrene under identical conditions. As shown below, the first three polymerizations were catalyzed by 2 mg of MAO-activated $CpTiCl_3$ with a Al:Ti ratio of 1000:1 at 18° C. in 13 ml of toluene. The fourth run employed 0.005 mg of $CpTiCl_3$ with a Al:Ti ratio of $1.4 \times 10^5:1$.

| Run | Monomer (g) | Time (min) | Yield (g) | Conv (%) | Polymer Structure |
|---|---|---|---|---|---|
| 1 | 1.21 | 4 | 0.96 | 79.3 | cis-1,4 |
| 2 | 2.28 | 15 | 0.190 | 8.3 | syndiotactic 1,2 |
| 3 | 1.52 | 1000 | 0.60 | 39.5 | cis-1,4 |
| 4 | 1.42 | 3 | 0.45 | 31.7 | syndiotactic 1,2 |

As can be seen, the reactivities increase in the following order: isoprene<<styrene<butadiene<<4-methyl-1,3-pentadiene.

Recent research by Baird suggests that, under some conditions, styrene may be polymerized via a carbocationic mechanism with these types of catalysts. These new results may have implications for dienes and other monomers polymerized with Ti-based piano-stool catalysts when the co-catalyst is $B(C_6F_5)_3$.

As alluded to earlier, discrete, base-free alkyl cations can be synthesized from $CpMR_3$-type complexes, where M represents a Group IV metal and R represents an alkyl group, by adding $B(C_6F_5)_3$ (see U.S. Pat. No. 5,446,117). However, Baird's recently published results in this area indicate there is a strong temperature, solvent, and monomer dependence on the type of catalyst(s) present in solution which may, therefore, affect the mechanism of the polymerization itself (see Q Wang et al, Organometallics 1996, 15, 693). In Baird's work, $Cp*TiMe_3$ and $B(C_6F_5)_3$ are mixed under varying conditions generating a catalyst(s) which appears to produce atactic polystyrene via a carbocationic mechanism.

Baird observes that, in polar solvents like $CH_2Cl_2$, a catalyst(s) is produced which polymerizes styrene to form atactic polystyrene when $Cp*TiMe_3$ and $B(C_6F_5)_3$ are reacted at temperatures ranging from 20° C. to −78° C. In non-polar solvents like toluene, however, the same two catalyst components can be combined to form a catalyst(s) which polymerizes styrene to form sPS, but only if the temperature of the polymerization is kept above 0° C. When the polymerization is run below 0° C., only atactic polystyrene is formed. As an explanation of his results, Baird suggests that an active catalyst(s) species is formed that promotes the atactic polymerization of styrene via a carbocationic mechanism depending on the polymerization conditions.

As mentioned, Grassi showed that Ti(III) species form at 25° C. in chlorobenzene and toluene when $Cp*TiR_3$, where R is Me or Bz, is reacted with $B(C_6F_5)_3$. This is consistent with the general hypothesis that the active species in sPS catalysis with Ti-based piano-stool complexes is a CpTi(III)-$R^+$ species. However, based on Baird and Grassi's results, it is almost certain that more than one Ti-centered species can form and, depending on the conditions of temperature, solvent, and monomer, different species may become active catalysts. For example, Baird shows by NMR that, when $Cp*TiMe_3$ and $B(C_6F_5)_3$ are reacted in $CD_2Cl_2$ at low temperature and kept at low temperatures, the Ti(IV) species $[Cp*TiMe_2][MeB(C_6F_5)_3]$ which initially forms in this reaction remains stable and does not decompose into Ti(III) species or any other species. When the NMR is monitored as the temperature is increased, Baird notes that a number of new Cp* and Ti—Me resonances appear, indicating several new species are being formed. Furthermore, Baird showed that, when $Cp*TiMe_3$ and $B(C_6F_5)_3$ are combined at room temperature in $CH_2Cl_2$, $ClCH_2CH_2Cl_1$, or toluene, a very active catalyst(s) is formed which is capable of polymerizing ethylene. The conditions of room temperature and $CH_2Cl_2$ as solvent were noted earlier as conditions capable of forming a catalyst(s) suspected of producing atactic polystyrene via a carbocationic mechanism. However, ethylene is not easily polymerized via a carbocationic mechanism. Certainly, one possible explanation for these observations is that more than one catalyst species forms when $Cp*TiMe_3$ and $B(C_6F_5)_3$ are reacted.

It is not clear how this information relates to Ti-based piano-stool complex catalyzed conjugated diene polymerization. $B(C_6F_5)_3$ is not used as a co-catalyst in any of the conjugated diene polymerizations cited herein. Only MAO is used. The implications could be significant if MAO-activated Ti(IV)-based piano-stool species formed complexes similar to those formed when $B(C_6F_5)_3$ is used as a co-catalyst (counterion), given the proposed similarities between diene and styrene polymerizations with this type of catalyst. The evidence suggests that MAO-activated Ti-centered piano-stool complexes do behave in a similar way to those activated with $B(C_6F_5)_3$, if the reactions are conducted at room temperature or above (see P Longo et al, Macromol Chem Phys 1995, 196, 3015). Furthermore, Longo demonstrated that, in toluene, even at −17° C., MAO-activated $CpTiCl_3$ forms syndiotactic polystyrene.

Some aspects of piano-stool complex catalyzed styrene and diene polymerizations are less clear and require further investigation. For example, it is known that styrene inserts in the M—$R^+$ bond of piano-stool complexes in a 2,1 fashion, but other α-olefins, like propylene, generally insert into the M—$R^+$ bond of early metal-based metallocenes in a 1,2 fashion (see A Zambelli et al, Macromolecules 1987, 20, 2037). With high vinyl Ziegler-Natta diene polymerization catalysts, a 2,1 insertion of one of the diene double bonds into the $\eta^3$ M-allyl species is observed. It is not known if a similar 2,1 insertion occurs in high vinyl diene polymers catalyzed with piano-stool complexes. Certainly, questions remain concerning the oxidation state of the active species, especially in the case of Ti, and the possibility that more than one type of catalyst species can form. However, clearly Ti is superior to Zr and Hf as a catalyst for both diene and styrene monomers which may be one reason why Zr-based catalysts have not been studied as much as Ti-based catalysts (see P Longo et al, Makromol Chem Rapid Commun 1994, 15, 151). It would appear, in the case of styrene, it does not matter if the catalyst precursor starts with a Ti(III) or Ti(IV) metal center. Ti may, therefore, be superior to Zr because it is more easily reduced. In fact, Cp*ZrBz$_3$ has been shown by ESR to not form Zr(III) species when it is reacted with B(C$_6$F$_5$)$_3$. However, in diene polymerization, the literature is less clear on whether or not Ti(III) precursors work as well as Ti(IV) precursors. MAO-activated Ti(III) complexes like CpTiCl$_2$.2THF and [CpTiCl$_2$]$_n$ give diene polymers with the same microstructure as diene polymers catalyzed with Ti complexes that start with Ti in its +4 oxidation state, but with lower activity (see G Ricci et al, Makrol Chem, Macrolmol Symp 1995, 89, 383). One possible explanation for this phenomenon may be the difficulty with which Ti(III) complexes are obtained in a pure state, due to their extreme sensitivity to O$_2$ and H$_2$O (ie, air). Therefore, the difference between Ti(III) and Ti(IV) catalyst precursors may be due to a lack of purity and air sensitivity rather than a lack of inherent activity. Finally, in diene polymerization, Ti-based piano-stool catalysts cannot always be accurately characterized as "single site" catalysts because the molecular weight distributions in these polymerizations can be as high 4 to 6 (see J Chien et al, Macromolecules 1992, 25, 3199).

With the similarities noted between the mechanism of styrene and diene polymerizations, it is not surprising that some research has been conducted on their copolymerization with Ti-based piano-stool-type catalysts. The majority of this research has been conducted by Zambelli, et al (see C Pellecchia et al, Macromolecules 1992, 25, 4450). In his original work, Zambelli used 2 mg of MAO-activated CpTiCl$_3$ with a Al:Ti ratio of 1100:1, in 3 ml of toluene at 40° C. to copolymerize styrene and isoprene. The results are outlined in below:

| Styrene (g) | Isoprene (g) | Time (hr) | Yield (g) | Conv (%) | Molar Ratio Styrene/ Isoprene in Polymer |
|---|---|---|---|---|---|
| 5.3 | | 1 | 0.425 | 8.0 | |
| | 4.0 | 68 | 0.70 | 18 | |
| 1.7 | 2.5 | 68 | 0.37 | 9 | 0.075 |
| 2.6 | 2.0 | 68 | 0.25 | 5.4 | 0.15 |
| 3.4 | 1.3 | 68 | 0.42 | 8.8 | 0.28 |
| 4.3 | 0.70 | 68 | 0.41 | 8.2 | 1.1 |
| 4.7 | 0.65 | 68 | 0.60 | 11 | 1.2 |

It would appear that MAO-activated CpTiCl$_3$ is capable of copolymerizing styrene and the diene isoprene although conversion is poor and reaction times are long. As can be seen, this catalyst system is more active for the homopolymerization of styrene and isoprene than it is for the copolymerization of these two monomers. It can be further seen that styrene is much more reactive than isoprene when the two monomers are copolymerized, but the ratio of the monomers can be adjusted to produce a copolymer with an equimolar ratio of styrene and isoprene. The value of the product of the reactivity ratios, $r_1 \times r_2 = 2.3$, is low enough to suggest that the two monomers react according to closely related mechanisms and a nearly random copolymer is produced. Zambelli stated that the coordination of isoprene is expected to be stronger than coordination of styrene to the catalyst. The Ti-η$^3$-allyl bond of an inserted isoprene is expected to be stronger than the Ti-η$^2$-benzyl bond of an inserted styrene as well. Thus, coordination of isoprene would be faster and more favored than coordination of styrene, but the insertion of isoprene into a Ti-η$^3$-allyl bond would be slower than insertion into a Ti-η$^2$-benzyl bond. If both coordination and insertion were equal and rate determining, then the lower reactivity of isoprene in comparison with styrene in homopolymerization and the higher reactivity of isoprene copolymerizations with styrene could be justified. The molecular weights and the cis content of the copolymers were not given.

The near random monomer distribution in the styrene/isoprene copolymers generated in these initial results prompted the investigation of a wider variety of styrene/diene copolymerizations (see A Zambelli et al, Macromol Chem Phys 1994, 195, 2623). Styrene and butadiene were copolymerized with 2 mg of MAO-activated CpTiCl$_3$ with a Al:Ti ratio of 1100:1 in 5 ml of toluene at 18° C. The concentration of the monomers were varied and the reported results are shown below:

| Styrene (g) | Butadiene (g) | Time (min) | Yield (g) | Conv (%) | Molar Ratio Styrene/ Butadiene in Polymer |
|---|---|---|---|---|---|
| 10.83 | 0.736 | 15 | 0.122 | 1.9 | 0.82 |
| 18.01 | 0.741 | 15 | 0.165 | 1.6 | 1.40 |
| 23.23 | 0.784 | 15 | 0.184 | 1.4 | 1.81 |
| 30.00 | 0.790 | 15 | 0.205 | 1.2 | 2.4 |
| 34.37 | 0.790 | 20 | 0.22 | 1.2 | 2.78 |
| 36.45 | 0.795 | 15 | 0.145 | 0.73 | 2.86 |

In general, all of the polymerizations outline by Zambelli are reported to produce nearly random copolymers under the conditions used. The value of the product of the reactivity ratios, $r_1 \times r_2 = 1.6$, for the copolymerization of styrene and butadiene is even lower than that observed for styrene and isoprene. It is also reported that the reactivities of the monomers in homopolymerizations do not parallel the reactivities in copolymerization. As mentioned previously, the low homopolymerization rate of isoprene is simply due to the particularly low reactivity of the growing chains ending with an isoprene unit, in comparison with the growing chains ending with styrene units. On the other hand, butadiene is more reactive than styrene both when insertion occurs on growing chains ending with a butadiene unit and when it occurs on chains ending with a styrene unit.

When the copolymerizations of styrene/butadiene are compared under reaction conditions where the styrene concentration is held constant while the butadiene concentration is increased, an actual decrease in the yield is observed as shown below:

| Run | Styrene (mol/L) | Butadiene (mol/L) | Yield (g) |
|---|---|---|---|
| 1 | 3.27 | 0.39 | 0.128 |
| 2 | 3.26 | 0.21 | 0.115 |
| 3 | 3.22 | 0.10 | 0.108 |

-continued

| Run | Styrene (mol/L) | Butadiene (mol/L) | Yield (g) |
|---|---|---|---|
| 4 | 3.32 | | 0.880 |
| 5 | | 0.40 | 0.300 |

In runs 1–4, 1 mg of MAO-activated CpTiCl$_3$ with a Al:Ti ratio of 1000:1 is used as the catalyst in 4.5 ml of toluene at 18° C. In run 5, the conditions are identical except 3 mg of CpTiCl$_3$ is used in 26 ml of toluene. All five polymerizations were allowed to run for 90 minutes. This decrease in the copolymerization rate caused by the addition of even a small amount of butadiene to styrene, even though butadiene is more reactive in both homo- and copolymerizations, is unusual. However, the observation can be justified by assuming that growing chains ending with butadiene units are less reactive than chains ending with styrene units.

The results of the copolymerization of 4-methyl-1,3-pentadiene (4-MPD) and styrene are shown in the table below. These polymerizations were catalyzed with 2 mg of CpTiCl$_3$ with a Al:Ti ratio of 1100:1 at 18° C. with enough toluene was used to bring the total volume of the polymerization to 48 ml.

| Styrene (g) | 4-MPD (g) | Time (min) | Yield (g) | Conv (%) | Molar Ratio Styrene/4-MPD in Polymer |
|---|---|---|---|---|---|
| 25.8 | 0.219 | 30 | 0.144 | 0.55 | 0.56 |
| 22.2 | 0.200 | 60 | 0.30 | 1.3 | 0.60 |
| 31.1 | 0.177 | 30 | 0.86 | 2.8 | 0.69 |
| 37.3 | 0.223 | 30 | 0.116 | 0.31 | 1.48 |
| 40.5 | 0.202 | 30 | 0.80 | 2.0 | 1.23 |

4-MPD is homopolymerized by Ti-base piano-stool catalysts in a 1,2 fashion, which is likely to be the reason it is polymerized so rapidly. The exceptionally high reactivity of both the 4-MPD monomer and growing chains ending with a 4-MPD unit is apparent when the molar ratio of styrene and 4-MPD is compared to the amount of both monomers in the copolymerization.

As a 2,1 insertion of styrene is the only way a secondary $\eta^2$-benzyl interaction can occur, the 2,1 insertion of styrene is likely to occur because of this added stabilization. Similarly, diene insertions are likely to occur in such a way as to increase this potential of engaging in secondary interactions, like the formation of an $\eta^3$-allyl, barring steric effects. Therefore, the more electron releasing the monomer is when engaged in a secondary interaction, once it has inserted, the less electrophilic and less reactive the Ti metal center becomes. Correspondingly, if this secondary $\eta^n$ (n>1) interaction can be shifted more towards an $\eta^1$ interaction where there is only a single Ti—C bond, for any reason, the growing chain end will be more reactive. This is because the last inserted monomer will be bound less tightly causing the Ti metal center will be more electrophilic and, as a result, more reactive. Therefore, the reactivity of the different monomers toward any given reactive chain end increases in the order: styrene<isoprene<butadiene<4-MPD. This ordering is roughly in agreement with the increasing nucleophilicity of the monomers.

SUMMARY OF THE INVENTION

This invention is based upon the unexpected discovery that styrene-butadiene block copolymers having sPS blocks and cis-1,4-PBd blocks can be synthesized by polymerizing styrene and 1,3-butadiene utilizing certain catalyst systems when the polymerization is conducted at a 1,3-butadiene partial pressure which is within the range of about 10 mm of mercury to about 50 mm of mercury at a temperature which is within the range of about 0° C. to about 100° C. These block copolymers are comprised of many sPS blocks and many PBd blocks. These block copolymers will normally contain at least 5 sPS blocks and will preferably contain at least 10 sPS blocks.

This invention more specifically discloses a styrene-butadiene block copolymer which is comprised of (a) syndiotactic polystyrene blocks and (b) cis-1,4-polybutadiene blocks, wherein said cis-1,4-polybutadiene blocks have a vinyl content up to about 20 percent, wherein the syndiotactic polystyrene blocks have a syndiotactic microstructure content of at least 50 percent, wherein the block copolymer contains at least five syndiotactic polystyrene blocks and wherein said block copolymer has a weight average molecular weight which is within the range of about 10,000 to about 700,000.

This invention also reveals a process for the synthesis of a styrene-butadiene block copolymer having syndiotactic polystyrene blocks which comprises copolymerizing 1,3-butadiene and styrene at a temperature which is within the range of about 0° C. to about 100° C. and a 1,3-butadiene partial pressure which is within the range of about 10 mm of mercury to about 50 mm of mercury, wherein said copolymerization is conducted in the presence of a catalyst system which is comprised of a catalyst component and a co-catalyst component; wherein the catalyst component is of a structural formula selected from the group consisting of CpMX$_3$, CpMX$_2$, MX$_4$ and MX$_3$ wherein Cp represents an aromatic compound of the formula C$_5$R$_n$H$_{5-n}$ wherein R represents an alkyl, aryl, alkaryl, arlyalkyl, haloalkyl, haloaryl, haloalkaryl, haloarylalkyl, silyalkyl, silylaryl, silylalkaryl, silylarylalkyl, halosilylalkyl, halosilylaryl, halosilylalkaryl, halosilylarylalkyl, silylhaloalkyl, silylhaloaryl, silylhaloalkaryl, halosilylarylalkyl, alkoxy, siloxy, and so forth. R may also be NR'$_2$, PR'$_2$, SR', and BR'$_2$ connected through one or more carbon and/or silicon atoms, with the proviso that if there are more than one carbon atoms, they may be saturated or unsaturated, where each R' is the same or different and is hydride, or is hydrocarbyl or silyl, optionally substituted with one or more halogen atoms or alkoxy groups and having up to 20 carbon and/or silicon atoms. It should be noted that the R groups can be the same or different and that R can be bound to Cp in one or more places. In the formula C$_5$R$_n$H$_{5-n}$, n represents an integer from 0 to 5. M represents a metal selected from the group consisting of titanium, zirconium and hafnium, and X represents a member selected from the group consisting of hydrogen, halogen, alkyl, aryl, alkaryl, arlyalkyl, haloalkyl, haloaryl, haloalkaryl, haloarylalkyl, silylalkyl, silylaryl, silylalkaryl, silylarylalkyl, halosilylalkyl, halosilylaryl, halosilylalkaryl, halosilylarylalkyl, silylhaloalkyl, silylhaloaryl, silylhaloalkaryl, halosilylarylalkyl, alkoxy, siloxy, NR'$_2$, PR'$_2$, SR', and BR'$_2$. For MX$_3$, X may also be any organic acid containing from 1 to 20 carbon atoms, for example, acetylacetonate, acetate, benzoate, naphthenate, octanoate, neodecanoate, palmitate, stearate, salicaldehyde, trifluoroacetate, and so forth. It should be noted that the X groups can be the same or different. X groups may be bound to M in one or more places. The co-catalyst component is of a formula selected from the group consisting of

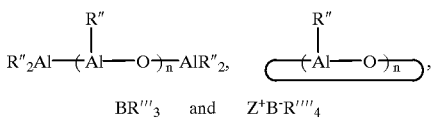

wherein R" represents an alkyl group containing from 1 to about 10 carbon atoms, wherein R'" represents a 2,3,4,5,6-pentafluorophenyl group or a 3,5-trifloromethylphenyl group, wherein R"" represents a 2,3,4,5,6-pentafluorophenyl group, a 3,5-trifluoromethylphenyl group, or a phenyl group and wherein Z represents an ammonium salt, a silver atom, or a triphenylmethyl group; with the proviso that, if the catalyst component is $MX_4$, then the co-catalyst component is of the formula

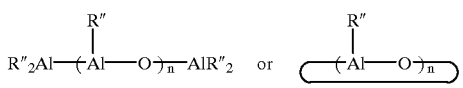

with the proviso that, if the catalyst component is $MX_3$, then the co-catalyst component is of the formula

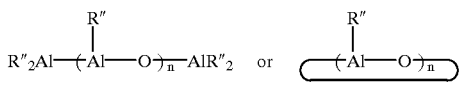

with the proviso that, if the co-catalyst component is of the formula $BR'''_3$, then at least one X represents an alkyl group, an aryl group, or an alkaryl group; and with the proviso that, if the co-catalyst component is of the formula $Z^+B^-R''_4$, then at least one X represents an alkyl group, an aryl group, or an alkaryl group.

The subject invention further discloses a block copolymer which is comprised of (a) at least one syndiotactic polystyrene block and (b) at least one hydrogenated polybutadiene block, wherein said block copolymer has a weight average molecular weight which is within the range of about 10,000 to about 700,000.

DETAILED DESCRIPTION OF THE INVENTION

The styrene-butadiene block copolymers of this invention are comprised of sPS blocks and cis-1,4-PBd blocks. The cis-1,4-PBd blocks will have a vinyl content of up to about 20 percent. The cis-1,4-PBd blocks will typically have a vinyl content (a 1,2-microstructure content) which is within the range of about 7 percent to about 20 percent. These styrene-butadiene block copolymers will typically have an absolute weight average molecular weight which is within the range of about 10,000 to about 700,000. The styrene-butadiene block copolymers will more typically have an absolute weight average molecular weight which is within the range of about 20,000 to about 500,000. In cases where the styrene-butadiene copolymer has a relatively high bound styrene content, such as about 50 percent bound styrene, it will typically have a weight average molecular weight which is within the range of about 25,000 to about 50,000. These block copolymers are comprised of more than one polystyrene block and more than one polybutadiene block. These block copolymers will normally contain at least 5 sPS blocks and will more typically contain at least 10 sPS blocks. The sPS blocks have a syndiotactic microstructure content of at least 50 percent and typically at least 75 percent. In most cases, the polystyrene blocks will have a syndiotactic microstructure content of at least 90 percent and preferably at least 95 percent.

The styrene-butadiene block copolymers of this invention are synthesized by copolymerizing styrene and 1,3-butadiene under a 1,3-butadiene partial pressure which is within the range of about 10 mm of mercury to about 50 mm of mercury utilizing certain catalyst systems. It is critical for the copolymerization to be carried out at a 1,3-butadiene partial pressure which is within the range of 10 mm of mercury to about 50 mm of mercury to attain the desired block copolymer having blocks of sPS and blocks of cis-1,4-PBd. If the 1,3-butadiene partial pressure employed is too high, a polybutadiene homopolymer will result. However, if the polymerization is carried out under too low of a 1,3-butadiene partial pressure, a polystyrene homopolymer will be produced. In most cases, the copolymerization will be carried out utilizing a 1,3-butadiene partial pressure which is within the range of about 15 mm of mercury to about 40 mm of mercury. It is normally preferred to utilize a pressure which is within the range of about 20 mm of mercury to about 35 mm of mercury.

The copolymerizations of this invention can be carried out over a broad temperature range of from about 0° C. to about 100° C. The copolymerization will typically be carried out at a temperature which is within the range of about 5° C. to about 80° C. It is normally preferred to conduct the copolymerization at a temperature which is within the range of about 15° C. to about 45° C.

The copolymerizations employed in synthesizing the styrene-butadiene block copolymers of this invention will normally be carried out in a hydrocarbon solvent which can be one or more aromatic, paraffinic or cycloparaffinic compounds. These solvents will normally contain from 4 to 10 carbon atoms per molecule and will be liquid under the conditions of the polymerization. Some representative examples of suitable organic solvents include pentane, isooctane, cyclohexane, methylcyclohexane, isohexane, n-heptane, n-octane, n-hexane, benzene, toluene, xylene, ethylbenzene, diethylbenzene, isobutylbenzene, petroleum ether, kerosene, petroleum spirits, petroleum naphtha, and the like, alone or in admixture. The polymerizations of this invention can also be conducted as bulk phase or gas phase reactions with the catalyst system being either supported or unsupported.

In the solution polymerization, there will normally be from 5 to 50 weight percent monomers in the polymerization medium. Such polymerization media are, of course, comprised of the organic solvent and monomers. In most cases, it will be preferred for the polymerization medium to contain from 20 to 40 weight percent monomers. It is generally more preferred for the polymerization medium to contain 30 to 35 weight percent monomers.

The catalyst systems employed in the practice of this invention include a catalyst component and a co-catalyst component. The catalyst component is of a structural formula selected from the group consisting of $CpMX_3$, $CpMX_2$, $MX_4$ and $MX_3$ wherein Cp represents an aromatic compound of the formula $C_5R_nH_{5-n}$ wherein R represents an alkyl, aryl, alkaryl, arlyalkyl, haloalkyl, haloaryl, haloalkaryl, haloarylalkyl, silyalkyl, silylaryl, silylalkaryl, silylarylalkyl, halosilylalkyl, halosilylaryl, halosilylalkaryl, halosilylarylalkyl, silylhaloalkyl, silylhaloaryl, silylhaloalkaryl, halosilylarylalkyl, alkoxy, siloxy, and so forth. R may also be NR'$_2$, PR'$_2$, SR', and BR'$_2$ connected through one or more carbon and/or silicon atoms, with the proviso that if there are more than one carbon atoms, they may be saturated or unsaturated, where each R' is the same or different and is hydride, or is hydrocarbyl or silyl, optionally substituted with one or more halogen atoms or alkoxy groups and having up to 20 carbon and/or silicon atoms. It should be noted that the R groups can be the same or different and that R can be bound to Cp in one or more places. In the formula $C_5R_nH_{5-n}$, n represents an integer from 0 to 5. M represents a metal selected from the group consisting of titanium, zirconium and hafnium, and X represents a member selected from the group consisting of hydrogen, halogen, alkyl, aryl, alkaryl, arlyalkyl, haloalkyl, haloaryl, haloalkaryl, haloarylalkyl, silylalkyl, silylaryl, silylalkaryl, silylarylalkyl, halosilylalkyl, halosilylaryl, halosilylalkaryl, halosilylarylalkyl, silylhaloalkyl, silylhaloaryl, silylhaloalkaryl, halosilylarylalkyl, alkoxy, siloxy, NR'$_2$, PR'$_2$, SR', and BR'$_2$. For MX$_3$, X may also be any organic acid containing from 1 to 20 carbon atoms, for example, acetylacetonate, acetate, benzoate, naphthenate, octanoate, neodecanoate, palmitate, stearate, salicaldehyde, trifluoroacetate, and so forth. X groups may be bound to M in one or more places. It should be understood that substituent groups bonded to the cyclopentadienyl (Cp) can be bonded to it at more than one site. The X groups in the catalyst component can be the same or different, saturated or unsaturated, and can be bonded to the metal (M) in one or more places. In the case of CpMX$_2$ and MX$_3$, the metal M is in the III oxidation state and, in the case of CpMX$_3$ and MX$_4$, the metal M is in the IV oxidation state. Some specific representative examples of compounds which can be employed as Cp include:

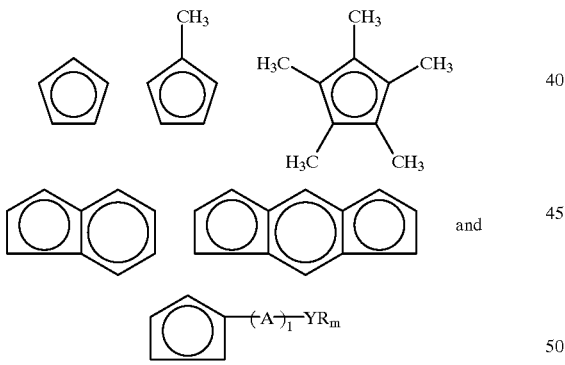

and wherein A represents an alkylene group (for example —CH$_2$— or —CH$_2$—CH$_2$—) or an arylene group (—C$_6$H$_4$—), wherein Y represents oxygen or sulfur group (in which case m is 1) or nitrogen, boron or phosphorus (in which case m is 2); wherein R represents an alkyl, aryl, alkaryl, arlyalkyl, haloalkyl, haloaryl, haloalkaryl, haloarylalkyl, silylalkyl, silylaryl, silylalkaryl, silylarylalkyl, halosilylalkyl, halosilylaryl, halosilylalkaryl, halosilylarylalkyl, silylhaloalkyl, silylhaloaryl, silylhaloalkaryl, halosilylarylalkyl, alkoxy, siloxy, and so forth. R may also be NR'$_2$, PR'$_2$, SR', and BR'$_2$ connected through one or more carbon and/or silicon atoms, with the proviso that if there are more than one carbon atoms, they may be saturated or unsaturated, where each R' is the same or different and is hydride, or is hydrocarbyl or silyl, optionally substituted with one or more halogen atoms or alkoxy groups and having up to 20 carbon and/or silicon atoms. It should be noted that the R groups can be the same or different and that R can be bound to Cp in one or more places, and wherein 1 represents 0 or 1. Some representative examples of specific compounds of this type include:

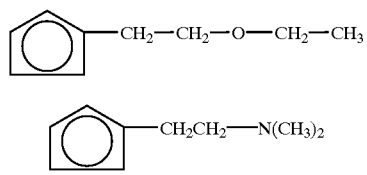

The co-catalyst component has a formula selected from the group consisting of

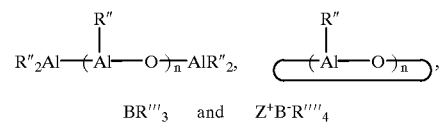

BR'''$_3$   and   Z$^+$B$^-$R''''$_4$ wherein R" represents an alkyl group containing from 1 to about 10 carbon atoms, wherein R'" represents a 2,3,4,5,6-pentafluorophenyl group or a 3,5-trifloromethylphenyl group, wherein R"" represents a 2,3,4,5,6-pentafluorophenyl group, a 3,5-trifluoromethylphenyl group, or a phenyl group, wherein Z represents an ammonium salt, ferrocenium ion, indenium ion, cationic derivatives or substituted ferrocene or indene, a silver atom, or a triphenylmethyl group and wherein n represents an integer from 1 to about 40 and preferably 3 to about 20. In actual practice, R'" and R"" can be other types of electron withdrawing substituents which can be the same or different. In co-catalysts of the MAO type which are of the formula:

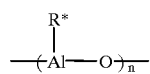

R* will preferably contain from 1 to about 4 carbon atoms with methyl groups being most preferred.

Some representative examples of R'" groups that can be employed in the BR'''$_3$ include:

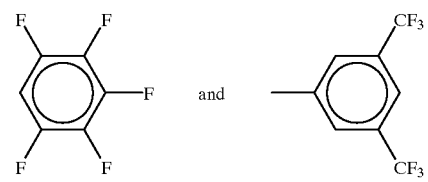

Some representative examples of R"" groups that can be employed in the Z$^+$B$^-$R""$_4$ molecule include:

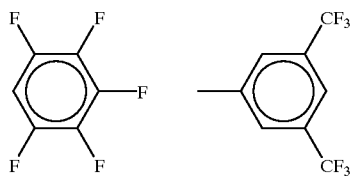

In $Z^+B^-R''''_4$, the R'''' group is preferably 2,3,4,5,6-pentafluorophenyl group.

If the catalyst component is $MX_4$ or $MX_3$, then the co-catalyst component is of the formula

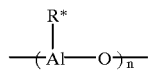

If the co-catalyst component is of the formula $BR'''_3$ or $Z^+B^-R''''_4$, then at least one X represents an alkyl group, an aryl group, or an alkaryl group. In most cases, X will represent a methyl group or a benzyl group. However, X can be any group that is capable of being abstracted from the metal (M).

The molar ratio of aluminum in the co-catalyst component to metal in the catalyst component will typically be within the range of about 10:1 to about 10,000:1. The molar ratio of aluminum in the co-catalyst component to metal in the catalyst component will preferably be within the range of about 100:1 to about 5,000:1. It is generally most preferred for the molar ratio of aluminum in the co-catalyst component to metal in the catalyst component to be within the range of about 400:1 to about 2,000:1. In commercial applications, the molar ratio of aluminum in the co-catalyst component to metal in the catalyst component will normally be within the range of about 50:1 to about 500:1. The molar ratio of the boron in the co-catalyst to metal in the catalyst will typically be within the range of 0.7:1 to 1.5:1. The molar ratio of the boron in the co-catalyst to metal in the catalyst will more typically be within the range of 0.9:1 to 1.1:1. It is highly desirable for the molar ratio of the boron in the co-catalyst to metal in the catalyst to be as close as possible to 1:1. The catalyst system will typically be employed at a level which is within the range of about $1\times10^{-5}$ phm (parts per 100 parts of monomer) to about 20 phm. The catalyst will more typically be employed at a level which is within the range of $1\times10^{-4}$ phm to 2 phm and will preferably be employed at a level which is within the range of 0.001 phm to 0.2 phm.

This invention is illustrated by the following examples which are merely for the purpose of illustration and are not to be regarded as limiting the scope of the invention or the manner in which it can be practiced. Unless specifically indicated otherwise, parts and percentages are given by weight.

EXAMPLES

General Procedures

All manipulations were performed under an $N_2$ atmosphere using standard Schlenk techniques or an inert atmosphere gloved dry box. Methylalumoxane (MAO), purchased from Witco as a 10 weight percent solution in toluene, was dried under vacuum at 50° C. overnight to remove solvent and free $Al(CH_3)_3$ and was used in the solid form. Toluene, purchased from Carlo Erba, was treated with concentrated $H_2SO_4$, followed by washing with a saturated $NaHCO_3$ solution and distilled $H_2O$ to remove thiophene ($C_4H_4S$). Toluene was then dried over $CaCl_2$ and distilled from Na metal prior to being used. Styrene, purchased from Aldrich, was distilled from $CaH_2$ under reduced pressure before being used. Polymerization grade 1,3 butadiene, purchased from Societa Ossigeno Napoli (S.O.N.), was passed through a column of activated 3 Å molecular sieves prior to being used. Ti(t-butoxy)$_4$ was purchased from Aldrich and purified by distillation at reduced pressure. $CpTiCl_3$, $CpTiF_3$, $Cp^*TiF_3$, $Cp^*Ti(CH_3)_3$, Ti(acetylacetonate)$_3$, and $B(C_6F_5)_3$ were prepared according to the literature. p-toluenesulfonylhydrazide, purchased from Aldrich, (THS) was dried under vacuum at 50° C. for 9 hours and stored under nitrogen in a brown glass bottle before being used. Polymer molecular weights were determined by SEC. The glass transition temperatures (Tg) and melt points (Tm) were determined by DSC. The average sequence lengths were calculated based on $^{13}C$ NMR data and were compared to the results of ozonolysis experiments. Polymer microstructures were determined by $^1H$, $^{13}C$, VT $^{13}C$, and DEPT NMR experiments and are reported in mole percent. Note that S=styrene, B=cis-1,4-PBd or trans-1,4-PBd, V=1,2-butadiene, E=ethylene, b=butene and nd=not detected or not determined.

NMR Characterization of Syndiotactic Polystyrene-Polybutadiene Block Copolymers The presence of syndiotactic styrene sequences and cis-1,4-polybutadiene sequences was determined by $^{13}C$ NMR ($CDCl_3$): syndio-SSS triad ($SS_1S$, 44.3 ppm; $SS_2S$, 41.0 ppm); BBB triad ($BC_1B$ and $BC_4B$, 27.4 ppm; $BC_2B$ and $BC_3B$, 129.8 ppm). The copolymeric nature of these block copolymers was determined by the presence of key $^{13}C$ NMR ($CDCl_3$) resonances, including: SSBB triad ($S_2SBB$, 40.5 ppm; $SS_1BB$, 42.2 ppm; $SS_2BB$, 43.3 ppm; $SSC_1B$, 35.6 ppm; $SSB_4B$, 27.4). Chemical shifts are referenced to TMS.

NMR Characterization of Hydrogenated Syndiotactic Polystyrene-Polybutadiene Block Copolymers The presence of polyethylene sequences was determined by VT $^{13}C$ NMR (1,1,2,2-tetrachloroethane): EEEE triad (27.78 ppm). The copolymeric nature of these block copolymers was determined by the presence of key $^{13}C$ NMR (1,1,2,2-tetrachloroethane) resonances, including: SSEE triad ($S_1SEE$, 42.9 ppm; $S_2SEE$, 39.4 ppm; $SS_1EE$, 41.6; $SS_2EE$, 41.9 ppm; $SSE_1E$, 35.4 ppm; $SSE_2E$, 25.3 ppm; $SSEE_1$, 27.78 ppm). Chemical shifts are referenced to TMS.

Polymerization Procedure

An oven-dried 250 mL three-neck round-bottom flask was flushed with dry $N_2$ until cooled to ca 25° C. Under positive $N_2$ pressure, the three-neck round-bottom flask was fit with a gas tight mechanical stirring mechanism, a rubber septa and an oven-dried ground glass stopcock through which the flask was connected to vacuum, $N_2$ or 1,3 butadiene, Dry toluene (100 mL), followed by dry styrene (50 mL), were transferred via cannula into the round-bottom flask under $N_2$ pressure. A toluene (10 mL) solution of the desired amount of solid MAO, prepared in advance in a dry box using an oven-dried Schlenk flask, was transferred via cannula into the round-bottom flask with stirring under $N_2$ pressure. The rubber septa on the three-neck round-bottom was then replaced with an oven-dried ground glass jointed stopcock.

The round-bottom flask was then placed in a constant temperature bath set at the desired temperature. The stirring solution was then allowed to reach thermal equilibrium for 0.5 h. While maintaining an inert environment, the total pressure within the round-bottom flask was made to equal the atmospheric pressure. The desired partial pressure of 1,3-butadiene was achieved in the round-bottom flask by introducing 1,3-butadiene at the desired overpressure with vigorous stirring. After 0.5 h, a toluene (10 mL) solution of the desired catalyst, prepared in advance in a dry box using an oven-dried Schlenk flask, was injected into the stirring flask, through the stopcock, using an oven-dried glass syringe. Before the syringe was removed from the round-bottom flask, the exact volume of head gas was removed as catalyst solution was injected. Typically after 1.0 h, EtOH (ca 20 mL) was introduced into the round-bottom flask to stop the polymerization. The polymerization mixture was then poured into a beaker of stirring EtOH (ca 400 mL), acidified with HCl. The coagulated polymer was collected by filtration, washed with EtOH until neutral by pH and dried under vacuum to constant weight.

Hydrogenation Procedure

A toluene solution (120 mL) of the desired syndiotactic polystyrene-polybutadiene block copolymer (2–3 w/w %) was treated with 2 equiv of THS for each butadiene unit, in a 250 mL round-bottom flask equipped with a reflux condenser and a Teflon stirbar. The reaction mixture was refluxed for 8 hours, turning to a yellow solution when the temperature reached 60–80° C. The reaction solution was cooled to ca 25° C. and filtered. The resulting colorless filtrate was treated with ethanol (300 mL) and the coagulated hydrogenated block copolymer was recovered by filtration. The filtered block copolymer was washed with excess ethanol and hot water and was dried under vacuum at 80° C. to constant weight.

EXAMPLE 1

Catalyst: $CpTiCl_3$, $3.0\times10^{-5}$ mol; Co-catalyst: MAO, $1.2\times10^{-2}$ (Al/Ti molar ratio=400); 1,3 Butadiene Overpressure: 22.9 mmHg; Yield: 0.233 g; Temperature: 15° C.; Polymer Microstructure: S=43, B=50, V=7; Molecular Weight: Mw=31,7000; $r_1 \times r_2$, 562; DSC: Tg, −66.7° C., Tm, 249.6° C.; Average Sequence Lengths: $n_s$=14.7, $n_b$=19.6.

EXAMPLE 2

Catalyst: $CpTiCl_3$, $3.0\times10^{-5}$ mol; Co-catalyst: MAO, $1.2\times10^{-2}$ (Al/Ti molar ratio=400); 1,3 Butadiene Overpressure: 23.8 mmHg; Yield: 0.410 g; Temperature: 15° C.; Polymer Microstructure: S=15, B=78, V=7; Molecular Weight: Mw=41,400; $r_1 \times r_2$, 285; DSC: Tg, −86.7° C., Tm, nd; Average Sequence Lengths: $n_2$=4.8 $n_b$=33.3.

EXAMPLE 3

Catalyst: $CpTiCl_3$, $3.0\times10^{-5}$ mol; Co-catalyst: MAO, $1.2\times10^{-2}$ (Al/Ti molar ratio=400); 1,3 Butadiene Overpressure: 24.8 mmHg; Yield: 1.401 g; Temperature: 15° C.; Polymer Microstructure: S=2, B=83, V=15; Molecular Weight: Mw=319,400.

EXAMPLE 4

Catalyst: $CpTiCl_3$, $3.0\times10^{-5}$ mol; Co-catalyst: MAO, $1.2\times10^{-2}$ (Al/Ti molar ratio=400); 1,3 Butadiene Overpressure: 33.8 mmHg; Yield: 1.420 g; Temperature: 15° C.; Polymer Microstructure: S=0.3, B=83, V=16.7; Molecular Weight: Mw=501,300.

EXAMPLE 5

Catalyst: $CpTiCl_3$, $3.0\times10^{-5}$ mol; Co-catalyst: MAO, $1.2\times10^{-2}$ (Al/Ti molar ratio=400); 1,3 Butadiene Overpressure: 25.7 mmHg; Yield: 0.860 g; Temperature: 25° C.; Polymer Microstructure: S=20, B=67, V=13; Molecular Weight: Mw=367,900.

EXAMPLE 6

Catalyst: $CpTiCl_3$, $3.0\times10^{-5}$ mol; Co-catalyst: MAO, $1.2\times10^{-2}$ (Al/Ti molar ratio=400); 1,3 Butadiene Overpressure: 35.7 mmHg; Yield: 0.73 g; Temperature: 35° C.; Polymer Microstructure: S=21, B=70.3, V=8.7; Molecular Weight: Mw=56,090.

EXAMPLE 7

Catalyst: $CpTiCl_3$, $3.0\times10^{-5}$ mol; Co-catalyst: MAO, $1.2\times10^{-2}$ (Al/Ti molar ratio=400); 1,3 Butadiene Overpressure: 37.6 mmHg; Yield: 3.7 g; Temperature: 35° C.; Polymer Microstructure: S=8, B=75, V=17; Molecular Wight: Mw=170,300.

EXAMPLE 8

Catalyst: $CpTiCl_3$, $3.0\times10^{-5}$ mol; Co-catalyst: MAO, $1.2\times10^{-2}$ (Al/Ti molar ratio=400); 1,3 Butadiene Overpressure: 35.7 mmHg; Yield: 0.860 g; Temperature: 45° C.; Polymer Microstructure: S=90, B−V=10; Molecular Weight: Mw=51,794.

EXAMPLE 9

Catalyst: $CpTiF_3$, $3.0\times10^{-5}$ mol; Co-catalyst: MAO, $1.2\times10^{-2}$ (Al/Ti molar ratio=400); 1,3 Butadiene Concentration: 0.4 M; Yield: 0.45 g; Temperature: 25° C.; Polymer Microstructure: S=43, B=43, V=14.

EXAMPLE 10

Catalyst: $Cp*TiF_3$, $3.0\times10^{-5}$ mol; Co-catalyst: MAO, $1.2\times10^{-2}$ (Al/Ti molar ratio=400); 1,3 Butadiene Concentrations: 0.4 M; Yield: 0.56 g; Temperature: 25° C.; Polymer Microstructure: S=7, B=75, V=18.

EXAMPLE 11

Catalyst: $Cp*Ti(CH_3)_3$, $3.0\times10^{-5}$ mol; Co-catalyst: MAO, $1.2\times10^{-2}$ (Al/Ti molar ratio=400); 1,3 Butadiene Overpressure: 21.8 mmHg; Yield: 0.057 g; Temperature: 15° C.; Polymer Microstructure: S=20, B=65, V=15.

EXAMPLE 12

Catalyst: $Ti(acac)_3$, $3.0\times10^{-5}$ mol; Co-catalyst: MAO, $1.2\times10^{-2}$ (Al/Ti molar ratio=400); 1,3 Butadiene Overpressure: 20.5 mmHg; Yield: 0.085 g; Temperature: 15° C.; Polymerization time: 2.0 h; Polymer Microstructure: S=39, B=51, V=10.

EXAMPLE 13

Catalyst: $Ti(O^tBu)_4$, $3.0\times10^{-5}$ mol; Co-catalyst: MAO, $1.2\times10^{-2}$ (Al/Ti molar ratio=400); 1,3 Butadiene Overpressure: 26.1 mmHg; Yield: 0.048 g; Temperature: 15° C.; Polymer Microstructure: S=96, B−V=4.

EXAMPLE 14

Catalyst: $Cp*Ti(CH_3)_3$, $3.0\times10^{-5}$ mol; Co-catalyst: MAO, $1.2\times10^{-2}$ (Al/Ti molar ratio=400); 1,3 Butadiene Overpressure: 26.3 mmHg; Yield: 0.057 g; Temperature: 15° C.; Polymer Microstructure: S=9, B=78, V=3.

EXAMPLE 15

Catalyst: Cp*Ti(CH$_3$)$_3$, 3.0×10$^{-5}$ mol; Co-catalyst: MAO, 1.2×10$^{-2}$ (Al/Ti molar ratio=400); 1,3 Butadiene Overpressure: 21.9 mmHg; Yield: 0.03 g; Temperature: 15° C.; Polymer Microstructure: S=96, B+V=4.

EXAMPLE 16

Catalyst: Cp*Ti(CH$_3$)$_3$, 3.0×10$^{-5}$ mol; Co-catalyst: MAO, 1.2×10$^{-2}$ (Al/Ti molar ratio=400); 1,3 Butadiene Overpressure: 22.6 mmHg; Yield: 0.6 g; Temperature: 25° C.; Polymer Microstructure: S=65, B=32, V=3.

EXAMPLE 17

Catalyst: Cp*Ti(CH$_3$)$_3$, 3.0×10$^{-5}$ mol; Co-catalyst: B(C$_6$F$_5$)$_3$, 3.0×10$^{-5}$ mol, TIBA, 9.0×10$^{-4}$; 1,3 Butadiene Overpressure: 23.2 mmHg; Yield: 0.022 g; Temperature: 25° C.; Polymer Microstructure: S=82, B=14, V=4.

EXAMPLE 18

Catalyst: Cp*Ti(CH$_3$)$_3$, 3.0×10$^{-5}$ mol; Co-catalyst: B(C$_6$F$_5$)$_3$, 3.0×10$^{-5}$ mol, TIBA, 9.0×10$^{-4}$; 1,3 Butadiene Overpressure: 22.6 mmHg; Yield: 0.03 g; Temperature: 25° C.; Polymer Microstructure: S=94, B=4, V=2.

EXAMPLE 19

Catalyst: Cp*Ti(CH$_3$)$_3$, 3.0×10$^{-5}$ mol; Co-catalyst: B(C$_6$F$_5$)$_3$, 3.0×10$^{-5}$ mol, TIBA, 9.0×10$^{-4}$; 1,3 Butadiene Overpressure: 25.1 mmHg; Yield: 0.084 g; Temperature: 30° C.; Polymer Microstructure: syndiotactic polystyrene (some atactic polystyrene was also detected).

EXAMPLE 20

Polymer Microstructure of Syndiotactic Polystyrene-Polybutadiene Block Copolymers: S=70, B=27, V=3; Polymer Microstructure of resulting Hydrogenated Syndiotactic Polystyrene-Polybutadiene Block Copolymers: S=47, E+b=53; DSC: Tm(styrene), 215° C., Tm(ethylene), 49° C.; Average Sequence Lengths: $n_s$=20, $n_E$=11.

EXAMPLE 21

Polymer Microstructure of Syndiotactic Polystyrene-Polybutadiene Block Copolymers: S=66, B=26, V=8; Polymer Microstructure of resulting Hydrogenated Syndiotactic Polystyrene-Polybutadiene Block Copolymers: S=45, E+b=55; DSC: Tm(styrene), 212° C., Tm(ethylene), 60° C.; Average Sequence Lengths: $n_s$=19, $n_E$=14.

EXAMPLE 22

Polymer Microstructure of Syndiotactic Polystyrene-Polybutadiene Block Copolymers: S=24, B=61, V=15; Polymer Microstructure of resulting Hydrogenated Syndiotactic Polystyrene-Polybutadiene Block Copolymers: S=14, E=79, b=7; DSC: Tm(styrene), not detected, Tm(ethylene), 84° C.; Average Sequence Lengths: $n_s$=2, $n_E$=132.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A styrene-butadiene block copolymer which is comprised of (a) syndiotactic polystyrene blocks and (b) cis-1,4-polybutadiene blocks, wherein said cis-1,4-polybutadiene blocks have a vinyl content of up to about 20 percent, wherein the syndiotactic polystyrene blocks have a syndiotactic microstructure content of at least 50 percent, wherein the block copolymer contains at least five syndiotactic polystyrene blocks and wherein said block copolymer has a weight average molecular weight which is within the range of about 10,000 to about 700,000 as determined by size exclusion chromography.

2. A block copolymer which is comprised of (a) at least one syndiotactic polystyrene block and (b) at least one hydrogenated polybutadiene block, wherein said block copolymer has a weight average molecular weight which is within the range of about 10,000 to about 700,000 as determined by size exclusion chromotography.

3. A process for the synthesis of a styrene-butadiene block copolymer having syndiotactic polystyrene blocks which comprises copolymerizing 1,3-butadiene and styrene at a temperature which is within the range of about 0 C. to about 100 C. and a 1,3-butadiene partial pressure which is within the range of about 10 mm of mercury to about 50 mm of mercury, wherein said copolymerization is conducted in the presence of a catalyst system which is comprised of a catalyst component and a co-catalyst component; wherein the catalyst component is of a structural formula selected from the group consisting of CpMX$_3$, CpMX$_2$, MX$_4$ and MX$_3$ wherein Cp represents an aromatic anion of the formula C$_5$R$_n$H$_{5-n}$ wherein R represents a member select from the group consisting of alkyl, aryl, alkaryl, arlyalkyl, haloalkyl, haloaryl, haloalkaryl, haloarylalkyl, silyalkyl, silylaryl, silylalkaryl, silylarylalkyl, halosilylalkyl, halosilylaryl, halosilylalryl, halosilylarylalkyl, silylhaloalkyl, silylhaloaryl, silylhaloalkaryl, halosilylarylalkyl, alkoxy, siloxy, NR'$_2$, PR'$_2$, SR', and BR'$_2$ groups, wherein the NR'$_2$, PR'$_2$, SR', and BR'$_2$ groups are connected though one or more carbon and/or silicon atoms, with the proviso that if there are more than one carbon atoms, they may be saturated or unsaturated, where each R' is the same or different and is hydride, or is hydorcarbyl or silyl, optionally substituted with one or more halogen atoms or alkoxy groups and having up to 20 carbon and/or silicon atoms, wherein the R groups can be the same or different, wherein the R can be bound to Cp in one or more places, wherein n represents an integer from 0 to 5, wherein M represents a metal selected from the group consisting of titanium, zirconium and hafnium and wherein X represents a member selected from the group consisting of hydrogen, halogen, alkyl, aryl, alkaryl, arlyalkyl, haloalkyl, haloaryl, haloalkaryl, haloarylalkyl, silyalkyl, silylaryl, silylalkaryl, silylarylalkyl, halosilylalkyl, halosilylaryl, halosilylalkaryl, halosilylarylalkyl, silylhaloalkyl, silylhaloaryl, silylhaloalkaryl, halosilylarylalkyl, alkoxy, siloxy, NR'$_2$, PR'$_2$, SR', and BR'$_2$; with the proviso that for MX$_3$, X is an organic acid containing from 1 to 20 carbon atoms, wherein X groups may be bound to M in one or more places; wherein the co-catalyst component is of a formula selected from the group consisting of

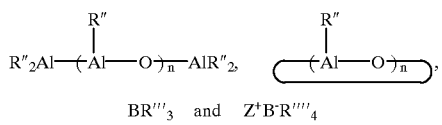

BR'''₃ and Z⁺B⁻R''''₄ wherein R" represents an alkyl group contain from 1 to about 10 carbon atoms, wherein R'" represents a 2,3,4,5,6-pentafluorophenyl group or a 3,5-trifloromethylphenyl group, wherein R"" represents a 2,3,4,5,6-pentafluorophenyl group, a 3,5-trifluoromethylphenyl group, or a phenyl group and wherein Z represents an ammonium salt, a silver atom, or a triphenylmethyl group; with the proviso that, if the catalyst component is $MX_4$, then the co-catalyst component is of the formula

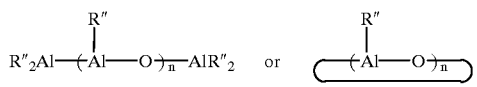

with the proviso that, if the metallocene component is $MX_3$, then the co-catalyst component is of the formula

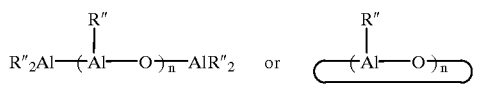

with the proviso that, if the co-catalyst component is of the formula BR'''₃, then at least one X represents an alkyl group, an aryl group, or an alkarly group; and with the proviso that, if the co-catalyst component is of the formula Z⁺B⁻R"4, then at least one X represents an alkyl group, an aryl group, or an alkaryl group.

4. A styrene-butadiene block copolymer as specified in claim 1 wherein said copolymer has a weight average molecular weight which is within the range of about 20,000 to about 500,000 as determined by size exclusion chromotography.

5. A styrene-butadiene block copolymer as specified in claim 1 wherein said copolymer has a weight average molecular weight which is within the range of about 25,000 to about 50,000 as determined by size exclusion chromotography.

6. A block copolymer as specified in claim 2 wherein said copolymer has a weight average molecular weight which is within the range of about 20,000 to about 500,000 as determined by size exclusion chromotography.

7. A block copolymer as specified in claim 2 wherein said copolymer has a weight average molecular weight which is within the range of about 25,000 to about 50,000 as determined by size exclusion chromotography.

8. A process as specified in claim 3 wherein the catalyst component is of the formula $CpMX_3$.

9. A process as specified in claim 3 wherein the catalyst component is of the formula $CpMX_2$.

10. A process as specified in claim 3 wherein the catalyst component is of the formula $MX_4$.

11. A process as specified in claim 3 wherein the catalyst component is of the formula $MX_3$.

12. A process as specified in claim 8 wherein the co-catalyst component is of the formula

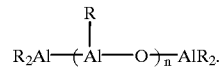

13. A process as specified in claim 9 wherein the co-catalyst component is of the formula

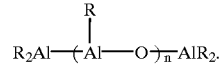

14. A process as specified in claim 10 wherein the co-catalyst component is of the formula

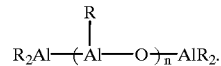

15. A process as specified in claim 11 wherein the co-catalyst component is of the formula

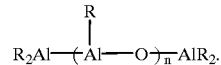

16. A process as specified in claim 2 wherein the temperature is within the range of about 5° C. to about 80° C.

17. A process as specified in claim 16 wherein the 1,3-butadiene partial pressure is within the range of about 15 mm of mercury to about 40 mm of mercury.

18. A process as specified in claim 16 wherein the 1,3-butadiene partial pressure is within the range of about 20 mm of mercury to about 35 mm of mercury.

19. A process as specified in claim 18 wherein said copolymerization is carried out in the presence of an organic solvent.

20. A process as specified in claim 19 wherein the temperature is within the range of about 15° C. to about 45° C.

21. A block copolymer which is comprised of (a) syndiotactic blocks that are derived from a vinyl aromatic monomer and (b) cis-1,4-polybutadiene blocks, wherein said cis-1,4-polybutadiene blocks have a vinyl content of up to about 20 percent, wherein the syndiotactic blocks have a syndiotactic microstructure content of at least 50 percent, wherein the block copolymer contains at least five syndiotactic blocks and wherein said block copolymer has a weight average molecular weight which is within the range of about 10,000 to about 700,000 as determined by size exclusion chromotography.

22. A block copolymer as specified in claim 21 wherein the vinyl aromatic monomer is p-methylstyrene.

* * * * *